United States Patent

[11] 3,554,131

[72] Inventor Zeljko Radovic
 Aarau, Switzerland
[21] Appl. No. 814,783
[22] Filed Apr. 9, 1969
[45] Patented Jan. 12, 1971
[73] Assignee Sybron Corporation
 Rochester, N.Y.
 a corporation of New York
[32] Priority July 11, 1968
[33] Germany
[31] 1,756,772

[54] AUTOMATIC CONVEYOR FOR CONTAINER
 10 Claims, 4 Drawing Figs.
[52] U.S. Cl. ................................................ 104/165,
 198/41
[51] Int. Cl. ...............................................B65g 17/12,
 B65g 17/42
[50] Field of Search........................................... 104/147,
 226, 165; 198/41

[56] References Cited
UNITED STATES PATENTS

| | | | |
|---|---|---|---|
| 2,092,927 | 9/1937 | Merwitz | 40/106.45 |
| 2,276,472 | 3/1942 | Eberhart | 34/23 |
| 2,492,889 | 12/1949 | Royal | 65/11 |
| 2,609,915 | 9/1952 | De Burgh | 198/41 |
| 2,824,638 | 2/1958 | De Burgh | 198/41 |
| 3,109,532 | 11/1963 | Milan | 198/41 |
| 3,447,663 | 6/1969 | Sarovich | 198/41 |
| RE26,568 | 4/1969 | Sarovich | 198/41 |

Primary Examiner—Evon C. Blunk
Assistant Examiner—W. Scott Carson
Attorney—Theodore B Roessel ABSTRACT: A conveyor belt 2 travels across the face of permanent magnets 6, the magnets being moveable toward and away from the belt by a cam roller 16; the magnets being moved toward the belt to attract and hold against the belt a moveable self-supporting container so that the conveyor can move the container along the floor surface without supporting the full load of the container; the magnet being moveable away from the conveyor belt to release the container.

PATENTED JAN 12 1971 3,554,131
INVENTOR.
ZELJKO RADOVIC
BY Theodore B. Roessel
ATTORNEY
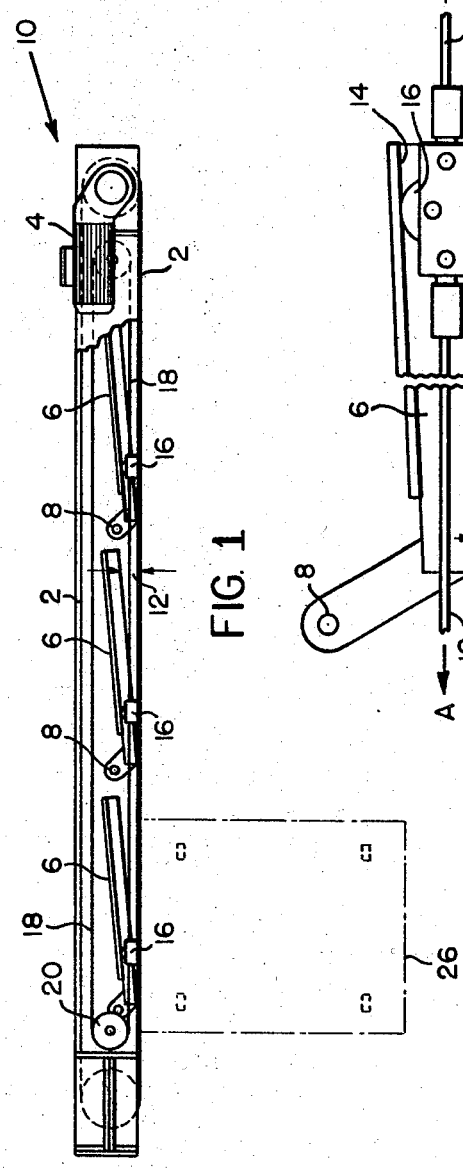
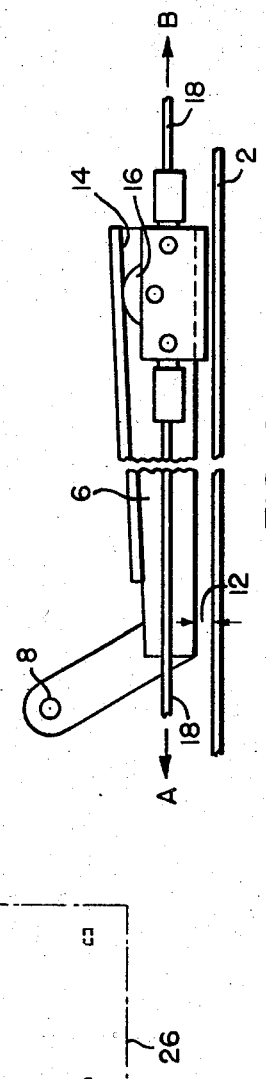
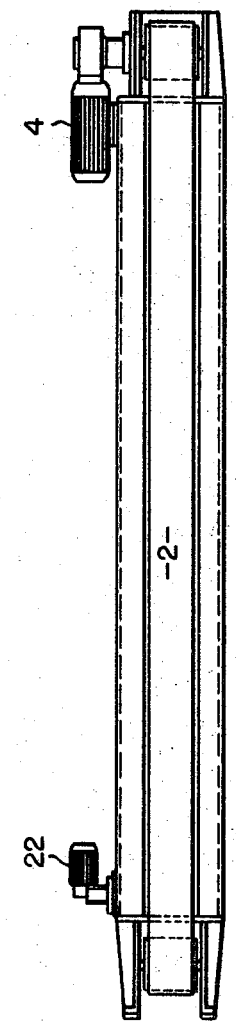
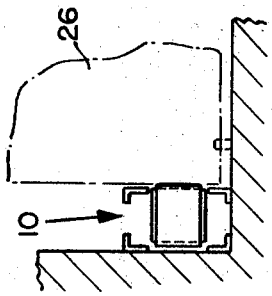

3,554,131

AUTOMATIC CONVEYOR FOR CONTAINER

BACKGROUND OF THE INVENTION

The invention relates to an automatic conveyor with a driven endless belt for moving self-supporting containers along a floor surface, the container or its support consisting at least partially of a magnetic material. More specifically the invention relates to an automatic conveyor wherein permanent magnets are moved toward the belt to attract and hold containers against the moving belt, the magnets being moved away from the belt to release the container.

Transportation systems with suspended tracks such as monorails which permit a programmed transport between predetermined unloading or loading stations are already known in the art. Such transportation systems are primarily used in factories, hospitals, offices or the like. Preferably, the load conveyed by such transportation systems are usually transported through shaftways, the load itself being retained in a wheeled container which is separable from the rail mounted transport vehicle. The common method of unloading or loading materials carried by such a transport vehicle would have the vehicle programmed to stop automatically at a desired stop station and the shaftway door exit station then opened to permit the removal of the wheeled container from the transport vehicle. In order to be able to operate the transport system most efficiently it is desirable that the unloading or loading be carried out automatically without manual assistance. In addition to the automatic removal of the container through the shaftway opening, it is also desirable to move the container away from the shaftway opening as quickly as possible in order to prevent congestion immediately adjacent the opening in cases, for example, where several containers are delivered to the same shaftway opening in quick succession. One solution to the removal of such containers from the shaftway opening is to provide a conveyor for receiving containers being discharged. While any type of conveyor may be used to convey containers from the shaftway opening, the conveyor in the present invention is a magnetic conveyor which can be wall mounted, the endless belt of the conveyor traveling in a plane parallel to or in the wall surface. It is also within the scope of the present invention to have the conveyor mounted in the floor with the endless belt of the conveyor traveling in the plane of the floor surface.

This conveyor is characterized by a magnetic unit arranged within the conveyor belt which attracts and holds the container to the belt. The container, being self-supported and mobile is attracted to and held against the belt which then moves the container along the floor surface. Such a conveyor belt eliminates the need for a conveyor which is capable of supporting the full weight of the container and also eliminates the need for positive engagement of the container with the conveyor belt such as by a dog or similar device for pulling the container along the floor surface.

While either permanent or electromagnets can be used in the present invention, permanent magnets have one drawback in that it is difficult to break the magnetic attraction for separating the container from the conveyor belt. On the other hand, where electromagnets are used, it is very easy to deenergize the magnet so that the container can be separated from the belt. However, electromagnets require a more sophisticated degree of control apparatus than do permanent magnets.

SUMMARY OF THE INVENTION

In the present invention, a conveyor system is provided which includes a permanent magnets arranged along a path of travel with the endless belt of the conveyor arranged to travel across the face of the permanent magnets so that containers constructed at least partially of a magnetic material are attracted against the belt with sufficient force to permit the endless conveyor belt to move the container along the floor surface. The permanent magnets are arranged on an adjusting mechanism for moving the magnets toward or away from the conveyor for narrowing or increasing the air gap respectively between the magnet and the conveyor belt. With this arrangement, if the air gap between the permanent magnets and the conveyor belt is reduced, the containers are attracted by the magnets and held against the belt so that the belt can move the containers along the floor surface. On the other hand, if the air gap between the magnets and the belt is increased, the magnetic attraction decreases so that the containers are not strongly held and can be separated from the belt. The conveyor is preferably designed in such a manner that each permanent magnet is pivoted for movement toward or away from the conveyor belt by a laterally moving cam follower.

OBJECT OF THE INVENTION

It is the object of the present invention to provide a conveyor for transporting mobile containers along the floor surface, the belt of the container being unable to support the weight of the container.

Another object of the present invention is to provide an endless belt conveyor having magnets for attracting and holding mobile containers against the endless belt.

Still another object of the present invention is to provide a magnetic conveyor which employs permanent magnets for attracting and holding moveable containers against the endless belt of the container.

A further object of the present invention is to provide a magnetic conveyor in which the permanent magnets used to attract and hold moveable containers against the endless belt of the conveyor are adjustable to facilitate the separation of the container from the belt.

These and other objects and advantages and characterizing features of the present invention will become more apparent on consideration of the following detailed description thereof when taken in conjunction with the accompanying drawings depicting the same.

DESCRIPTION OF THE DRAWINGS

FIG. 1 is a plan view of the magnetic conveyor of the present invention showing, in phantom, a container held against the belt of the conveyor;

FIG. 2 is a front view of the conveyor shown in FIG. 1;

FIG. 3 is a left side view of FIG. 1; and

FIG. 4 is a view on a larger scale of one of the permanent magnets and cam followers shown in FIG. 1.

DESCRIPTION OF THE PREFERRED EMBODIMENTS

FIG. 1 shows a conveyor generally indicated at 10 having an endless belt 2 which is coupled to a drive motor 4. Arranged within the conveyor belt is a series of relatively closely spaced permanent magnets 6 which are each pivoted for movement about a pivot point 8. The magnets and endless belt define an air gap 12 therebetween which can be narrowed or increased depending upon whether the magnets are respectively pivoted toward or away from the belt. Any suitable means such as a spring element (not shown) normally biases each magnet 6 toward the conveyor belt.

Each magnet has a cam surface 14 which is engageable with a cam roller 16 (FIG. 4). Cam rollers 16 are connected at spaced intervals to a pull element 18 which in turn is driven by a drive pulley 20 and adjusting motor 22.

As may be seen from FIGS. 1 and 4, movement of cam rollers 16 along cam surfaces 14 will pivot magnets 6 about pivot points 8 to adjust the angle of inclination of each permanent magnet with respect to conveyor belt 2. Adjustment of the angle of inclination in turn causes the size of air gap 12 between the permanent magnet and conveyor belt to vary.

FIG. 1 shows in phantom a wheeled container 26 located adjacent the conveyor belt. With the container against the belt, and prior to the movement of the container by the belt, adjusting motor 22 is activated so as to drive pull element 18 and cam rollers 16 in the direction indicated by arrow B. This permits the spring member (not shown) to move permanent magnets 6 clockwise as viewed in FIGS. 1 and 4 which narrows air gap 12 between the permanent magnets and the conveyor belt. Any suitable means (not shown) such as a trip shoe and limit switch can be used to shut off adjusting motor 22 responsive to the lateral movement of cam follower 16. By narrowing air gap 12, the magnetic attraction between the magnets and the container is increased so that the container is held against the belt with such force that the frictional engagement produced between the container and the belt is sufficient to permit the belt to move the container along the floor surface. Since the spacing between individual magnet 6 is small, the frictional engagement between the container and the conveyor belt is not significantly influenced during the transition from one permanent magnet to another as the container is moved across the floor surface by the belt. Once container 26 has been moved to its destination, any suitable means such as a limit switch (not shown) is activated to turn off drive motor 4 and turn on adjusting motor 22 reversing the direction of rotation of the adjusting motor. The reversing of adjusting motor 22 causes pull element 18 to move in the direction indicated by arrow A or to the left as viewed in FIGS. 1 and 4. Moving pull element 18 and cam roller 16 to the left causes the permanent magnet 6 to pivot away from the conveyor belt thereby increasing the air gap between the permanent magnet and the conveyor. Because of the increase size of air gap 12, the magnetic attraction between the permanent magnets and the magnetic portion of container 26 is reduced which allows the container to be separated from the conveyor belt.

FIG. 3 illustrates how the conveyor 10 can be wall mounted adjacent the floor surface. It is equally within the skill of the art to mount conveyor 10 in the floor surface so that belt 2 travels parallel to the plane of the floor. With this arrangement, the magnetic portion of the container would be located beneath the container so that the permanent magnets could hold the conveyor belt to the bottom or under carriage of the container.

Accordingly, it should be appreciated that the present invention accomplishes its intended objects by providing a magnetic conveyor wherein the magnetic force which attracts and holds containers against the conveyor belt is provided by adjustable magnets. The provision of the cam surface and cam roller arrangement 14 and 16, respectively, permit adjustment of the air gap 12 between the permanent magnet and the conveyor belt thereby greatly facilitating the ease with which containers can be attached to or moved from the conveyor.

I claim:

1. Means for moving containers along a floor surface comprising in combination:
    a. a container constructed in part of a magnetic material and having means for directly supporting said container on a floor surface for movement thereon;
    b. an adjustable magnetic member;
    c. a conveyor belt disposed for travel across said adjustable magnetic member, and, means for driving said belt; and
    d. means adjusting said magnetic member toward and away from said belt, said magnetic member being adjusted toward said belt to frictionally hold said container against said belt as said belt moves said container along said floor surface and said magnetic member being adjusted away from said belt to separate said container from said belt.

2. A conveyor according to claim 1 wherein said means comprises:
    a. a cam follower engageable with said magnetic member; and
    b. means for driving said cam follower across said cam surface to move said magnetic member towards or away from said belt.

3. A conveyor as in claim 1 wherein said conveyor belt is disposed in a plane substantially normal to said floor surface.

4. A conveyor as in claim 1 comprising a plurality of said magnetic members disposed in spaced-apart relationship along said conveyor belt.

5. A conveyor according to claim 1 wherein said magnetic member is a permanent magnet.

6. A conveyor according to claim 1 wherein said magnetic member is pivotally mounted for arcuate movement toward and away from said belt.

7. Means for moving containers along a floor surface comprising in combination:
    a. a container constructed in part of a magnetic material and having means for directly supporting said container on a floor surface for movement thereon;
    b. a movable belt, and, means for driving said belt;
    c. a plurality of spaced magnetic members arranged along the path of travel of said conveyor belt and arranged for movement toward and away from said belt, said magnetic members and conveyor belt defining an air gap therebetween; and
    d. means moving said magnetic members toward said belt and narrowing said air gap to frictionally hold said container against said belt and moving said magnetic members away from said belt to increase said air gap and release said container.

8. A conveyor according to claim 7 wherein said means comprises:
    a. a member movable with respect to said magnetic members and engageable therewith; and
    b. drive means for moving said member with respect to said magnetic member.

9. A conveyor according to claim 8 wherein said moveable member includes a cam follower corresponding to each of said magnetic members adapted to engage a corresponding cam surface on each of said magnetic members for moving said magnetic members toward and away from said conveyor belt.

10. Means for moving containers along a floor surface comprising in combination:
    a. a container constructed in part of a magnetic material and having means for directly supporting said container on a floor surface for movement thereon;
    b. a moveable belt, and means for driving said belt;
    c. magnetic means disposed along the path of travel of said belt for maintaining said container frictionally against said belt so that said belt moves said container along said floor surface; and
    d. means for increasing the magnetic attraction between said magnetic members and said container for moving said container along said floor surface and decreasing the magnetic attraction between said magnetic members and said container for releasing said container from said belt.